United States Patent
Fowler et al.

(10) Patent No.: US 8,210,201 B2
(45) Date of Patent: Jul. 3, 2012

(54) REGULATOR VALVE WITH LOCKING SYSTEM

(75) Inventors: Laurie Fowler, Apache Junction, AZ (US); Rudy Velasquez, El Mirage, AZ (US); Joe Sega, Phoenix, AZ (US); Ed Dismukes, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 1143 days.

(21) Appl. No.: 12/049,817

(22) Filed: Mar. 17, 2008

(65) Prior Publication Data
US 2009/0229682 A1 Sep. 17, 2009

(51) Int. Cl.
*F16K 31/14* (2006.01)

(52) U.S. Cl. ............ 137/495; 137/489.5; 137/492.5; 137/505.47; 251/29; 251/90

(58) Field of Classification Search .......... 137/489, 137/492, 492.5, 522, 523, 315.04, 505, 269, 137/599.09, 825, 198, 269.5, 505.14, 505.47, 137/505.37, 385, 15.24, 15.25, 495; 251/58–63.6, 251/89–116, 28, 31, 32, 242, 331
See application file for complete search history.

(56) References Cited

U.S. PATENT DOCUMENTS

| | | | | |
|---|---|---|---|---|
| 2,812,774 A * | 11/1957 | Anderson et al. | .............. | 137/489 |
| 2,884,003 A * | 4/1959 | Jensen | .............. | 137/495 |
| 2,938,537 A * | 5/1960 | Silver et al. | .............. | 137/489 |
| 3,537,473 A | 11/1970 | DeZurik, Jr. | | |
| 3,661,168 A * | 5/1972 | McGeachy | .............. | 137/270 |
| 3,771,759 A * | 11/1973 | Pauquette | .............. | 251/58 |
| 4,000,754 A * | 1/1977 | Risk | .............. | 137/487 |
| 4,093,178 A | 6/1978 | Hughes et al. | | |
| 4,108,371 A * | 8/1978 | Leemhuis | .............. | 236/49.4 |
| 4,114,465 A | 9/1978 | Troy | | |
| 4,275,754 A | 6/1981 | Lyons et al. | | |
| 4,617,958 A * | 10/1986 | Seidel et al. | .............. | 137/492.5 |
| 4,662,394 A | 5/1987 | Williams | | |
| 4,674,528 A | 6/1987 | Nishio et al. | | |
| 4,702,273 A * | 10/1987 | Allen et al. | .............. | 137/487.5 |
| 4,815,693 A * | 3/1989 | James et al. | .............. | 251/14 |
| 4,844,115 A * | 7/1989 | Bowers | .............. | 137/240 |
| 4,971,289 A * | 11/1990 | Pietras | .............. | 251/90 |
| 5,113,900 A * | 5/1992 | Gilbert | .............. | 137/515.5 |
| 5,190,263 A * | 3/1993 | Roberts | .............. | 251/60 |
| 5,215,112 A | 6/1993 | Davison | | |
| 5,236,172 A * | 8/1993 | Friemoth et al. | .............. | 251/90 |
| 5,261,445 A * | 11/1993 | Jones, Jr. | .............. | 137/382 |
| 5,329,959 A * | 7/1994 | Owen et al. | .............. | 137/315.17 |
| 5,370,148 A * | 12/1994 | Shafer | .............. | 137/15.25 |

(Continued)

*Primary Examiner* — John Rivell
*Assistant Examiner* — Matthew W Jellett
(74) *Attorney, Agent, or Firm* — Ingrassia Fisher & Lorenz, P.C.

(57) ABSTRACT

A regulator valve includes a duct, a valve element, and an actuator. The duct has an inner surface defining a flow passage. The valve element is movably disposed within the flow passage between an open position, in which fluid is permitted to flow through the flow passage, and a closed position, in which fluid is restricted from flowing through the flow passage. The actuator is coupled to the valve element and at least facilitates movement thereof between the closed and open positions and locking of the valve element in an intermediate position therebetween. The actuator comprises a shaft and a locking system. The shaft is coupled to the valve element and moves therewith. The locking system is coupled to the shaft and is activated when the valve element is in the intermediate position, to thereby at least inhibit movement of the shaft and the valve element.

14 Claims, 5 Drawing Sheets

U.S. PATENT DOCUMENTS

| | | |
|---|---|---|
| 5,400,819 A | 3/1995 | Lemmens |
| 5,427,140 A | 6/1995 | Bosanquet |
| 5,472,014 A | 12/1995 | Carlson |
| 5,579,804 A | 12/1996 | Roberts |
| 5,598,724 A | 2/1997 | Primeau |
| 5,979,053 A | 11/1999 | Schaeffer et al. |
| 5,979,872 A | 11/1999 | Stearns et al. |
| 6,196,268 B1 * | 3/2001 | Steiner et al. ............ 137/625.47 |
| 6,604,391 B2 * | 8/2003 | Vellette et al. .................. 70/177 |
| 6,684,898 B2 * | 2/2004 | Wiggins et al. ............ 137/15.25 |
| 6,840,503 B2 | 1/2005 | Fortino |
| 6,959,909 B2 | 11/2005 | Bancroft et al. |
| 7,117,884 B2 | 10/2006 | Shuter |
| 7,731,152 B2 * | 6/2010 | Abel et al. .................... 251/63.5 |
| 2008/0001109 A1 * | 1/2008 | Gutierrez et al. ................ 251/93 |

* cited by examiner

REGULATOR VALVE WITH LOCKING SYSTEM

TECHNICAL FIELD

The present invention generally relates to regulator valves, and more particularly relates to regulator valves with a locking system.

BACKGROUND

Valves are used to control gases or other fluids in various types of apparatus and vehicles, such as aircraft. For example, valves can be used to control the supply of air for an anti-icing system on aircraft by opening, closing, or partially obstructing various passageways, among various other valve uses. There are many different types of valves used in aircraft, other vehicles, and other apparatus, such as regulator valves, ball valves, and check valves, among others.

By way of example only, a particular type of regulator valve regulates the pressure of the fluid flowing through the valve via a downstream sensor, so that the pressure downstream is relatively constant, or at least variable only within a limited range. For example, when the downstream sensor senses a downstream pressure change, the regulator valve opens or closes, at least partially, to adjust fluid flow through the regulator valve, to thereby regulate the downstream fluid pressure.

Although regulator valves generally work well in regulating the pressure of the fluid flowing through a valve, in some instances it may be desired to lock a valve in a mid-lock position, for example in order to maintain a constant effective flow area, but this may be difficult. It also may be desired but difficult to allow for adjustment of such locking of a valve in a mid-lock position.

Accordingly, it is desirable to provide an improved regulator valve that can be locked in a mid-lock position, for example in order to maintain a constant effective flow area. It is also desirable to provide an improved regulator valve with an adjustable mid-lock position. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

In accordance with an exemplary embodiment of the present invention, a regulator valve is provided. The regulator valve comprises a duct, a valve element, and an actuator unit. The duct has an inner surface that defines a duct flow passage. The valve element is movably disposed within the duct flow passage, and is movable between a fully-open position and a closed position. When the valve element is in the fully-open position, fluid is permitted to flow at least substantially freely through the duct flow passage. When the valve element is in the closed position, fluid is at least substantially restricted from flowing through the duct flow passage. The actuator unit is coupled to the valve element. The actuator unit is configured to at least facilitate movement of the valve element between the closed position and the fully-open position and locking of the valve element in an intermediate position between the closed position and the fully-open position. The actuator comprises a shaft and a locking system. The shaft is coupled to the valve element, and is configured to move therewith. The locking system is coupled to the shaft, and is configured to be activated when the valve element is in the intermediate position, to thereby at least inhibit movement of the shaft and the valve element.

In accordance with another exemplary embodiment of the present invention, a regulator valve is provided. The regulator valve comprises a duct, a valve element, and an actuator unit. The duct has an inner surface that defines a duct flow passage. The valve element is movably disposed within the duct flow passage, and is movable between a fully-open position and a closed position. When the valve element is in the fully-open position, fluid is permitted to flow at least substantially freely through the duct flow passage. When the valve element is in the closed position, fluid is at least substantially restricted from flowing through the duct flow passage. The actuator unit is coupled to the valve element. The actuator unit is configured to at least facilitate movement of the valve element between the closed position and the fully-open position and locking of the valve element in an intermediate position between the closed position and the fully-open position. The actuator comprises a shaft, a locking mechanism, a first plate, and a second plate. The shaft is coupled to the valve element, and is configured to rotate therewith. The locking mechanism is movable between a first position and a second position. When the locking mechanism is in the first position, movement of the valve element is at least substantially allowed. When the locking mechanism is in the second position, movement of the valve element is at least substantially restricted. The first plate is coupled to the shaft, and is configured to rotate therewith. The first plate comprises an opening configured to allow insertion of the locking mechanism when the locking mechanism is in the second position, to thereby at least facilitate inhibiting movement of the first plate and, with it, the shaft and the valve element when the valve element is in the intermediate position. The second plate is configured to at least facilitate inhibiting movement of the first plate when the locking mechanism is inserted into the opening. The second plate comprises a protrusion configured to receive the locking mechanism when inserted through the opening.

In accordance with a further exemplary embodiment of the present invention, a regulator valve is provided. The regulator valve comprises a duct, a valve element, a regulator, and an actuator unit. The duct has an inner surface that defines a duct flow passage. The valve element is movably disposed within the duct flow passage, and is movable between a fully-open position and a closed position. When the valve element is in the fully-open position, fluid is permitted to flow at least substantially freely through the duct flow passage. When the valve element is in the closed position, fluid is at least substantially restricted from flowing through the duct flow passage. The regulator is configured to supply a reference pressure. The actuator unit is coupled to the valve element. The actuator unit is configured to at least facilitate movement of the valve element between the closed position and the fully-open position and locking of the valve element in an intermediate position between the closed position and the fully-open position. The actuator unit comprises a spring, an opening chamber, a closing chamber, a shaft, a locking system, and a piston. The spring is configured to exert a spring force. The opening chamber is configured to receive the reference pressure from the regulator. The closing chamber is configured to receive a feedback pressure. The shaft is coupled to the valve element, and is configured to rotate therewith. The locking system is coupled to the shaft, and is configured to be activated when the valve element is in the intermediate position, to thereby at least inhibit movement of the shaft and the valve element. The locking system is further configured to be adjustable to thereby adjust the intermediate position of the valve element at which the locking system is configured to be activated. The piston is coupled between the shaft and the spring. The piston is configured to receive the spring force, the reference pressure, and the feedback pressure and to cause movement of the valve element based at least in part on the spring force, the reference pressure, and the feedback pressure when the locking system is activated.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
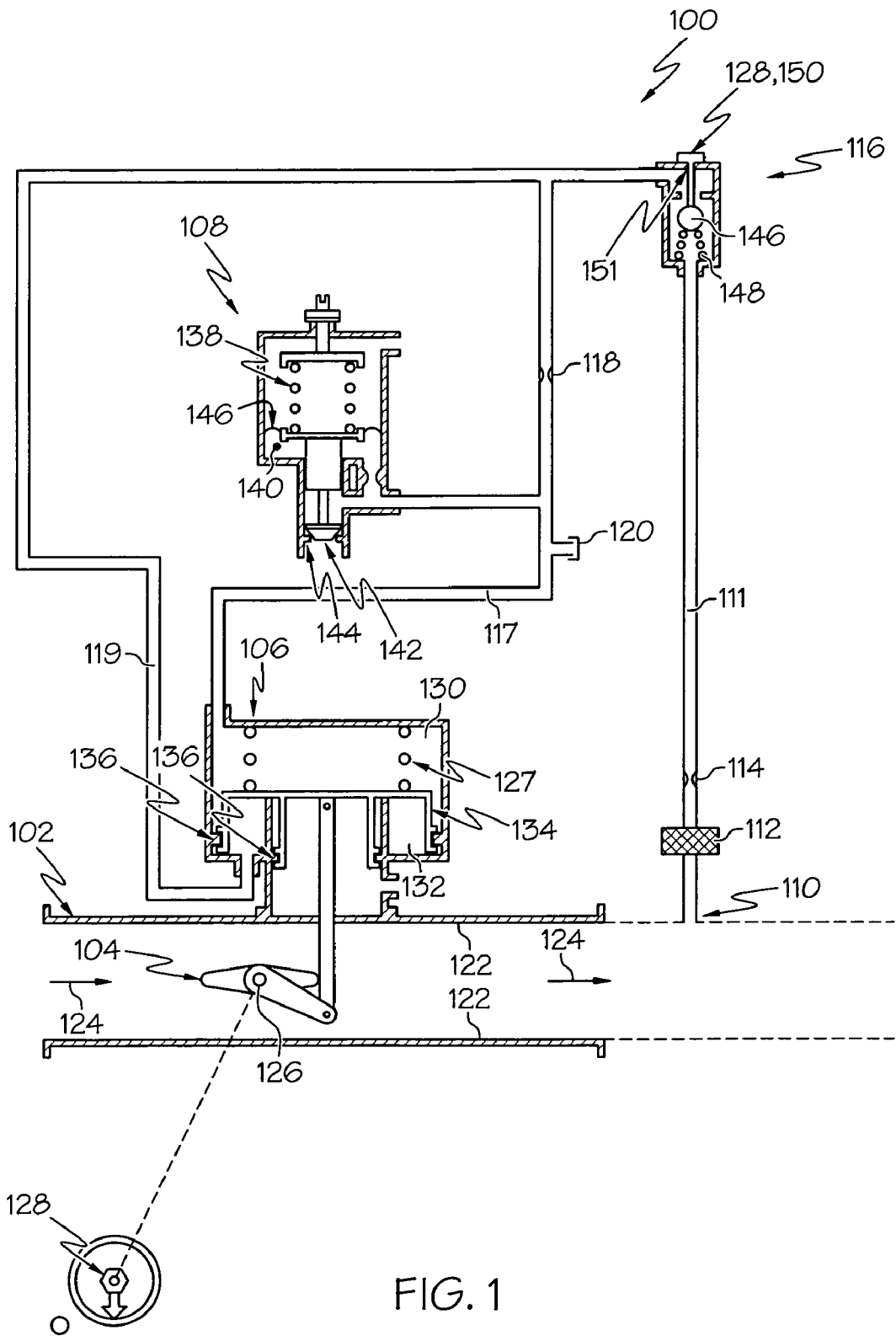
FIG. 1 is a schematic view of one embodiment of a regulator valve that can be locked in a mid-lock position, in accordance with an exemplary embodiment of the present invention.

FIG. 1 is a schematic view of one embodiment of a regulator valve assembly 100 that can be locked in a mid-lock position, in accordance with an exemplary embodiment of the present invention. The regulator valve assembly 100 includes a duct 102, a valve element 104, and an actuator unit 106. In the depicted embodiment, the regulator valve assembly 100 additionally includes a regulator unit 108, a downstream sense line 111, a filter 112, a protection orifice 114, a manual locking valve unit 116, a second line 117, a control orifice 118, a third line 119, and a test port 120, among other possible features.

The duct 102 has an inner surface 122 that defines a duct flow passage 124. The valve element 104 is disposed within the duct flow passage 124, and is movable to a closed position, a fully-open position, and at least one intermediate position therebetween. In the closed position, fluid is at least substantially restricted (and preferably prevented) from flowing through the duct flow passage 124. Conversely, in the intermediate and fully-open positions, fluid is at least partially allowed to flow through the duct flow passage 124. In the depicted embodiment, the valve element 104 is a butterfly valve element 104, although it will be appreciated that the valve element 104 can take any one of a number of different shapes, sizes and configurations. When in the fully-open position, the butterfly valve element 104 is at least substantially parallel to the duct flow passage 124. Conversely, when in the closed position, the butterfly valve element 104 is at least substantially perpendicular to the duct flow passage 124.

Generally, the closer the valve element 104 is to the fully-open position, fluid is allowed to flow more freely through the duct flow passage 124 and beyond the valve element 104, thereby increasing fluid pressure in the duct flow passage 124. For example, when the valve element 104 is in the fully-open position, fluid is allowed to flow at least substantially freely through the duct flow passage 124. Conversely, the closer the valve element 104 is to the closed position, fluid is allowed to flow less freely through the duct flow passage 124 and beyond the valve element 104, thereby decreasing fluid pressure in the duct flow passage 124.

In a preferred embodiment, the fluid flowing through the duct flow passage 124 comprises one or more types of air as used in an aircraft anti-icing system. However, this may vary in other embodiments. For example, different types of fluid may flow through the duct flow passage 124, and/or the regulator valve assembly 100 may be used in one or more various different types of applications in various other embodiments.

The actuator unit 106 is coupled to the valve element 104. The actuator unit 106 is configured to at least facilitate movement of the valve element 104 between the closed position and the fully-open position. The actuator unit 106 is further configured to lock the valve element 104 in an intermediate position between the closed position and the fully-open position. The actuator unit 106 is preferably further configured to receive a reference pressure, such as from the regulator unit 108 via the second line 117, to facilitate the regulation of fluid pressure and to coordinate movement of the valve element 104 when the valve element 104 is unlocked.

In the depicted embodiment, the actuator unit 106 comprises a shaft 126, a spring 127, a locking system 128, an opening chamber 130, a closing chamber 132, a piston 134, and a plurality of dynamic seals 136. The shaft 126 is coupled to the valve element 104, and is configured to rotate therewith. The spring 127 is configured to exert a spring force against the piston 134, preferably in a downward direction.

The locking system 128 is coupled to the shaft 126. The locking system 128 is configured to be activated when the valve element 104 is in the intermediate position, to thereby at least inhibit movement of the shaft 126 and the valve element 104 from the intermediate position. Preferably the locking system 128 comprises a plurality of plates (depicted in FIGS. 2-5 and described further below in connection therewith) and a locking mechanism 150. In a preferred embodiment the locking mechanism comprises a locking pin as depicted in FIG. 1, and will at various points hereafter be referred to as the locking pin 150. However, in other embodiments, the locking mechanism 150 may vary.

The locking pin 150 (or other locking mechanism 150) is movable between a first position (depicted in FIG. 1), in which the locking system 128 is not activated, and a second position, in which the locking system 128 is activated. In a preferred embodiment, the locking system 128 is further configured to be adjustable, to thereby adjust the intermediate position of the valve element 104 at which the locking system 128 is configured to be activated. One preferred embodiment of a locking system 128 with such an adjustable feature is depicted in FIGS. 2-5 in accordance with an exemplary embodiment of the present invention and will be described further below in connection therewith.

The opening chamber 130 is preferably formed at least in part by the piston 134, and is configured to receive a reference pressure. In a preferred embodiment, the opening chamber receives the reference pressure from the regulator unit 108. The closing chamber 132 is configured to receive a feedback pressure. In a preferred embodiment, the closing chamber 132 receives the feedback pressure from the duct flow passage 124 through the downstream sense line 111 and the third line 119, and/or through a plurality of non-depicted orifices.

The piston 134 is coupled between the shaft 126 and the spring 127. In a preferred embodiment, the piston 134 at least partially defines the opening chamber 130 and the closing chamber 132, and is disposed therebetween. The piston 134 is configured to receive the spring force from the spring 127, the reference pressure via the opening chamber 130, and the feedback pressure via the closing chamber 132. The piston 134 is further configured to cause movement of the valve element 104 based at least in part on the spring force, the reference pressure, and the feedback pressure when the locking system 128 is not activated.

Specifically, when the locking system 128 is not activated and the combined forces of the reference pressure from the opening chamber 130 and the spring force from the spring 127 against the piston 134 overcome the feedback pressure from the closing chamber 132 against the piston 134, then the piston 134 moves in a direction toward the valve element 104, thereby moving the shaft 126 and thereby moving the valve element 104 toward the fully-open position (depicted in FIG. 1). Conversely, when the locking system 128 is not activated and the combined forces of the reference pressure from the opening chamber 130 and the spring force from the spring 127 against the piston 134 are overcome by the feedback pressure from the closing chamber 132 against the piston 134, then the piston 134 moves in a direction away from the valve element 104, thereby moving the shaft 126 and thereby moving the valve element 104 toward the closed position.

Conversely, when the locking system 128 is activated, the piston 134 does not move, and the valve element 104 is locked in an intermediate position between the fully-open position and the closed position. The plurality of dynamic seals 136 provide sealing for the actuator unit 106, and help to maintain appropriate levels of pressure for the opening chamber 130 and the closing chamber 132.

As mentioned above, the regulator valve assembly 100 may also include a regulator unit 108, a fluid pressure sensor 110, a downstream sense line 111, a filter 112, a protection orifice 114, a manual locking valve unit 116, a second line 117, a control orifice 118, a third line 119, and a test port 120. The regulator unit 108, which is preferably coupled to the opening chamber 130, provides the reference pressure to the opening chamber 130 in a preferred embodiment, as described above. In addition, the regulator unit 108 can help to bleed off air in order to maintain a desired fluid pressure, thereby at least partially compensating for any potential leakage.

In the embodiment depicted in FIG. 1, the regulator unit 108 includes a regulator spring 138, a regulator sensing chamber 140, a regulator poppet 142, a regulator poppet seat 144, and a diaphragm 146. However, it will be appreciated that the regulator unit 108 can take any one of a number of different configurations. It will further be appreciated that the regulator unit 108 can regulate the fluid pressure in any one of a number of different implementations, including, by way of example only, the preferred embodiment depicted in FIG. 1. Regardless of the embodiment, the regulator unit 108 preferably supplies a regulated fluid reference pressure to the actuator unit 106, such as via the second line 117 depicted in FIG. 1.

The regulator valve assembly 100 may also be coupled to a fluid pressure sensor 110, as depicted in FIG. 1. Fore example, such a fluid pressure sensor 110 may sense fluid pressure within the duct flow passage 124 and allow for fluid to flow from the duct flow passage 124 toward the closing chamber 132, to thereby cause the above-referenced feedback pressure in the closing chamber 132 against the piston 134. Specifically, in the depicted embodiment, the fluid flows along the downstream sense line 111, through the filter 112 and protection orifice 114 along the way, and then through the manual locking valve unit 116 (discussed further below). After the fluid passes through the manual locking valve unit 116, the fluid flows through the third line 119 to the closing chamber 132. Additionally, in a preferred embodiment, a portion of the fluid flows through the second line 117 past a control orifice 118 and to the regulator 108. Some fluid also preferably exits via the control orifice 118 as appropriate. Also in a preferred embodiment, fluid may exit through the test port 120, for example during testing of the regulator valve assembly 100.

The manual locking valve unit 116 is coupled between the duct flow passage 124 and the closing chamber 132, and is configured to at least partially control the feedback pressure of fluid flow therebetween in a preferred embodiment. Also in a preferred embodiment, the manual locking valve 116 is configured to house the locking pin 150 of the locking system 128 when the locking pin 150 is in the above-referenced first position.

The manual locking valve unit 116 is movable between an open position and a closed position. When the manual locking valve unit 116 is in the open position, the locking pin 150 is housed therein, and fluid is allowed to flow between the duct flow passage 124 and the closing chamber 132. In addition, when the manual locking valve unit 116 is in the open position, fluid is also preferably allowed to flow between the duct flow passage 124 and the regulator 108. Conversely, when the manual locking valve 116 is in the closed position, the locking pin 150 is not housed therein, and fluid is restricted from flowing between the duct flow passage 124 and the closing chamber 132. In addition, when the manual locking valve unit 116 is in the closed position, fluid is also preferably at least restricted from flowing between the duct flow passage 124 and the regulator 108.

Figure 2:
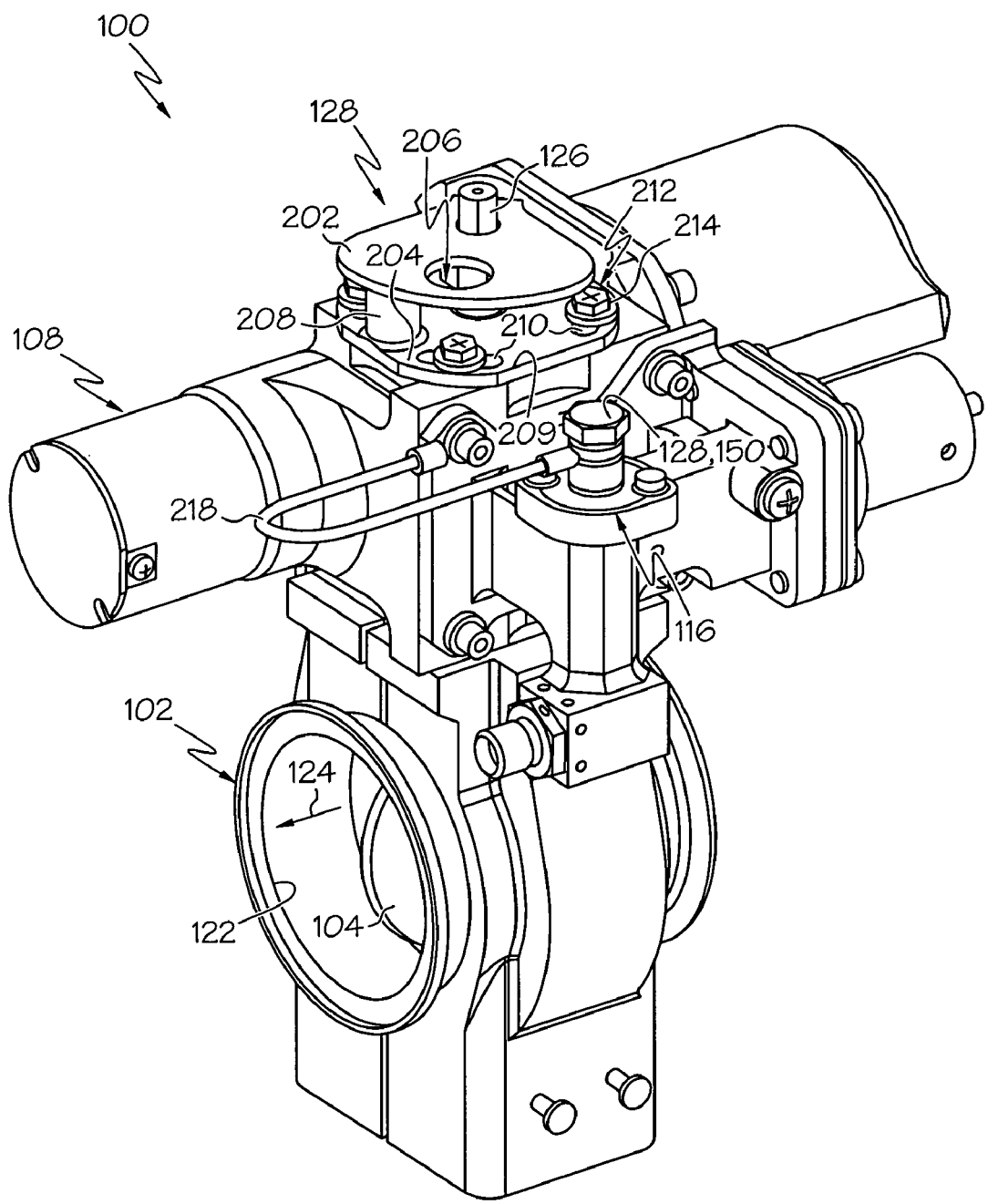
FIG. 2 is a perspective view of the regulator valve of FIG. 1, shown in a fully open position in which a locking system thereof is not activated, in accordance with an exemplary embodiment of the present invention.
Figure 3:
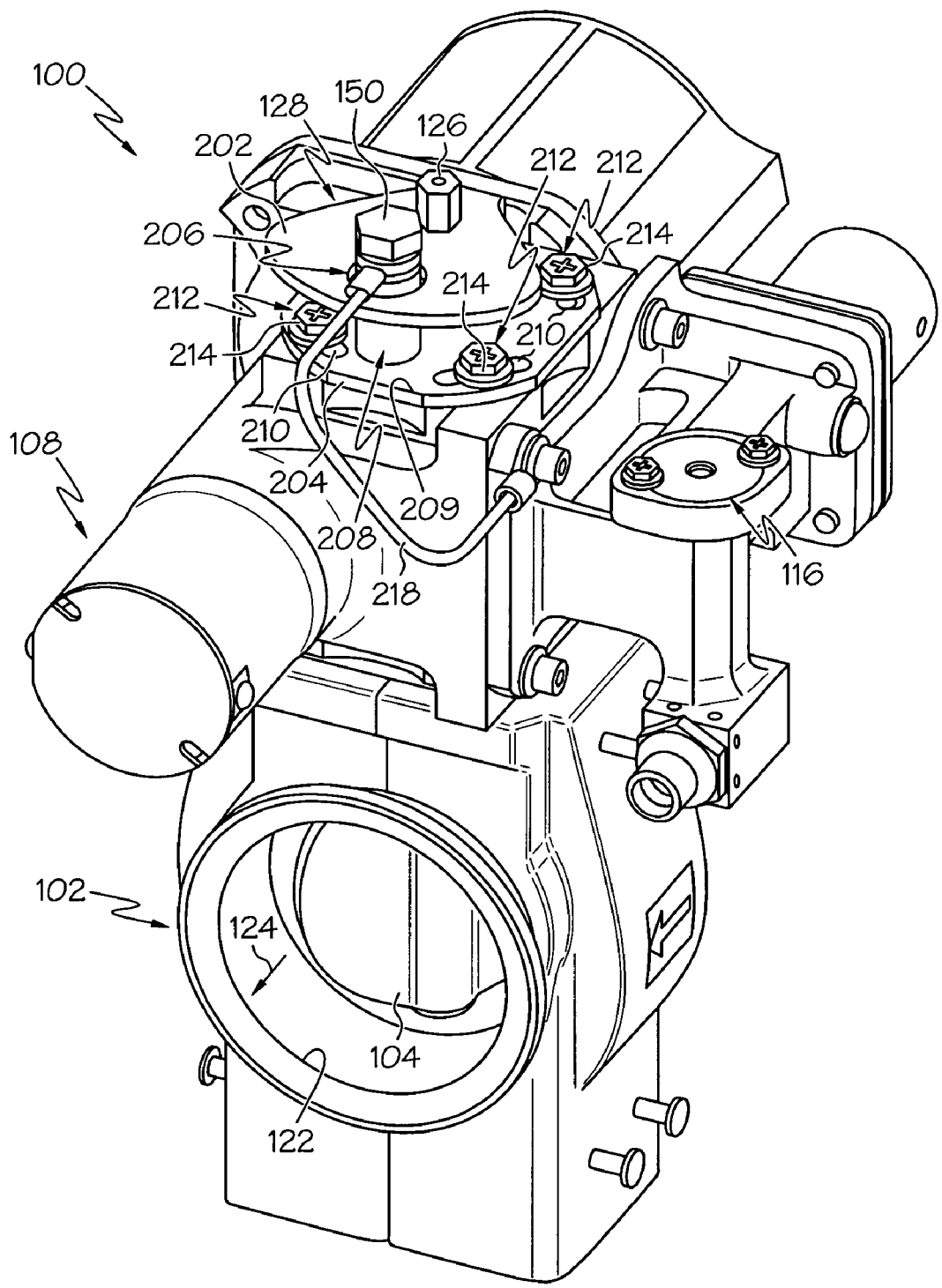
FIG. 3 is a perspective view of the regulator valve of FIGS. 1 and 2, shown in a partially open, mid-lock position in which a locking system thereof is activated, in accordance with an exemplary embodiment of the present invention.

FIGS. 2 and 3 are perspective views of the regulator valve assembly 100 of FIG. 1, in accordance with an exemplary embodiment of the present invention. Specifically, FIG. 2 is a perspective drawing depicting the regulator valve assembly 100 of FIG. 1 in a fully open position in which the locking system 128 is not activated, and FIG. 3 is a perspective drawing depicting the regulator valve assembly 100 of FIG. 1 in a partially open, mid-lock position in which the locking system 128 is activated, both in accordance with an exemplary embodiment of the present invention.

As shown in FIGS. 2 and 3, the locking system 128 preferable includes a first plate 202, a second plate 204, and a locking mechanism 150 such as the locking pin 150 described above in connection with FIG. 1. The first plate 202 is coupled to the shaft 126, and is configured to move therewith. The second plate 204 is configured to at least inhibit, and preferably prevent, movement of the first plate 202 when the locking system 128 is activated. This is turn at least inhibits movement of the shaft 126, which in turn at least inhibits, and preferably prevents, movement of the valve element 104. In a preferred embodiment, the first plate 202 comprises an opening 206 configured to receive the locking mechanism 150 and to allow insertion of the locking mechanism 150 therethrough.

Also in a preferred embodiment, the second plate 204 comprises a protrusion 208 configured to receive, mate with, be connected to or coupled to, or otherwise engage the locking mechanism 150 when the locking mechanism 150 is inserted through the opening 206, to thereby activate the locking system 128. Specifically, when the locking system 128 is not activated (as depicted in FIG. 2), the protrusion 208 is not aligned with the opening 206, and therefore the shaft 126 and the valve element 104 are allowed to move freely. Conversely, when the locking system 128 is activated (as depicted in FIG. 3), the protraction is aligned with the opening 206, and receives the locking mechanism 150, to thereby prevent movement of the shaft 126 and the valve element from moving freely, and thereby locking the regulator valve assembly 100 so that the valve element 104 remains in the intermediate position. In a preferred embodiment, the protrusion 208 is configured to be aligned with the opening 206 when the valve element 104 is in the intermediate position. Also in a preferred embodiment, this intermediate position is approximately half way between the fully-open position and the closed position; however, this may vary in other embodiments. As depicted in FIGS. 2 and 3, the protrusion 208 preferably extends from an upper surface 209 of the second plate 204.

Also in a preferred embodiment, the second plate 204 further comprises a plurality of adjustment openings 210 formed therein for adjustment of the locking system 128, as is also depicted in FIGS. 2 and 3. Also in this embodiment, the locking system 128 further comprises a screw assembly 212. The screw assembly 212 is coupled to the second plate 204, and is configured to be movable at least partially within the adjustment openings 210 of the second plate 204, to thereby at least facilitate movement of the second plate 204 and the protrusion 208 thereof, for example for adjustment purposes. The screw assembly 212 preferably comprises a plurality of screws 214, most preferably a screw 214 for each adjustment opening 210. In this embodiment, the locking system 128 is further configured to be adjustable to thereby adjust the intermediate position of the valve element 104 at which the locking system 128 is configured to be activated, as will be described in greater detail further below in connection with FIG. 4.

The locking mechanism 150 is configured to couple the first plate 202 to the protrusion 208 of the second plate 204, to thereby at least facilitate movement of the first plate 202, when the locking system 128 is activated. In a preferred embodiment, the locking mechanism 150 comprises a locking pin 150 movable between the above-referenced first and second positions. When in the first position, the locking pin 150 does not extend through the opening 206, and thereby the locking system 128 is not activated, and the shaft 126 and the valve element 104 are allowed to move freely. Conversely, when in the second position, the locking pin 150 extends through the opening 206 and preferably mates or otherwise connects with the protrusion 208. This at least substantially prevents movement of the first plate 202, and thus at least substantially prevents movement of the shaft 126 and the valve element 104 from the intermediate position.

Also, as described above in connection with FIG. 1, in a preferred embodiment the locking pin 150 is preferably housed within the manual locking valve unit 116 when in the first position, for example through a slot thereof. While in the first position, the locking pin 150 holds the manual locking valve unit 116 open. Conversely, when in the second position in this embodiment, the locking pin 150 is removed from the manual locking valve unit 116 and inserted into the opening 206 of the first plate 202 and coupled to the protrusion 208 of the second plate 204. When in the second position, the locking pin 150 thereby allows the manual locking valve unit 116 to close. However, it will be appreciated that this may vary in other embodiments.

Also in the depicted embodiment, the locking pin 150 is held in place by a lanyard 218 when in the second position. However, it will be appreciated that this may vary in other embodiments. In addition, it will be appreciated that any one of a number of different types of locking mechanisms 150, protrusions 208, and/or other components may also be used in other embodiments.

Figure 4:
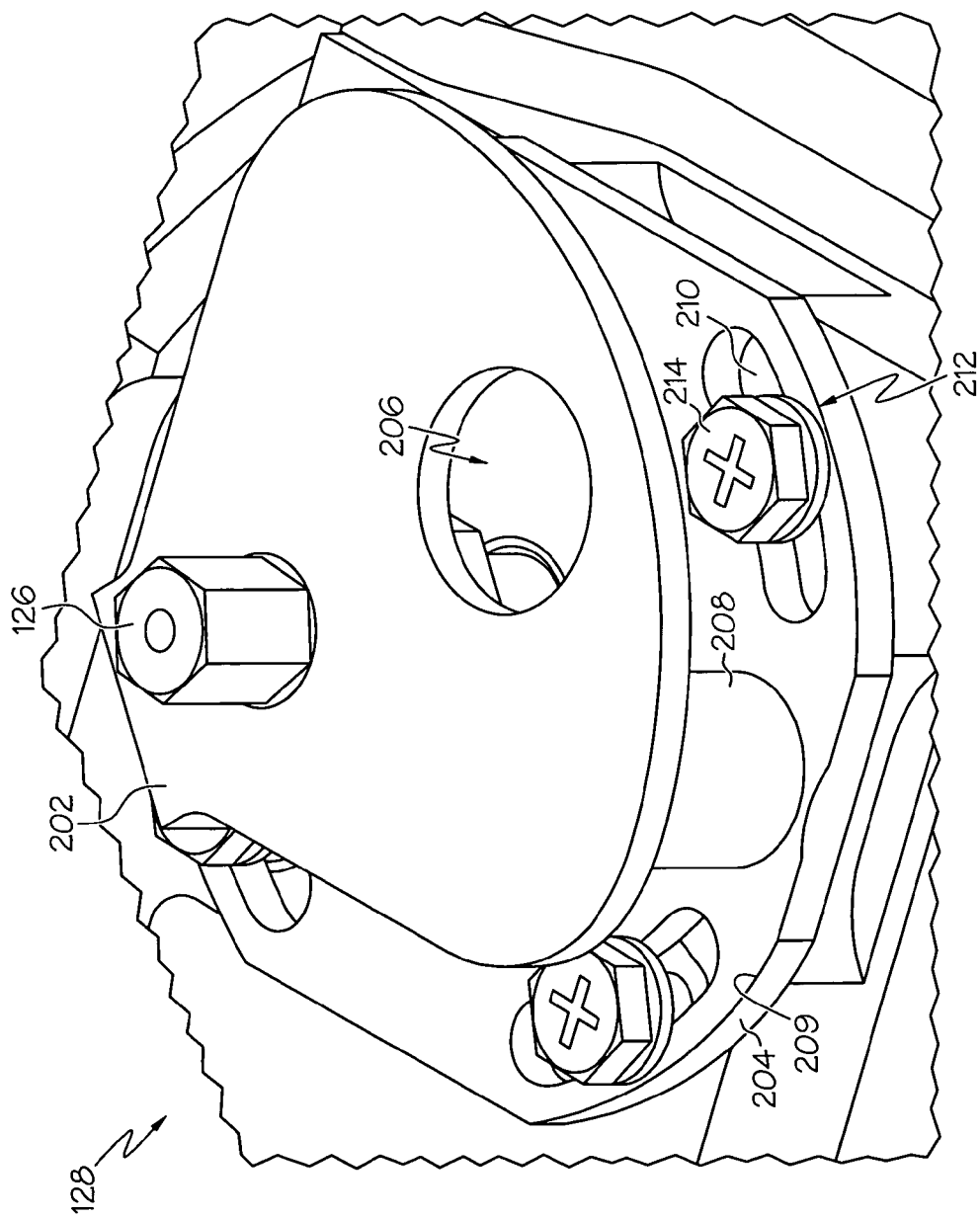
FIG. 4 is a close-up, top view of a portion of a locking system of the regulator valve of FIGS. 1-3, in accordance with an exemplary embodiment of the present invention.

FIG. 4 is a close-up, top view of a portion of the locking system 128 of the regulator valve assembly 100 of FIGS. 1-3, in accordance with an exemplary embodiment of the present invention. As shown in greater detail in FIG. 4, the screws 214 of the screw assembly 212 are configured to be adjustable within respective adjustment openings 210 of the second plate 204, to thereby adjust the locking system 128. Specifically, by rotating the second plate 204 and adjusting the screw assemblies 212 to an adjusted position within their respective adjustment openings 210 and then tightening the screws 214 to lock in the desired adjustments, this results in an adjustment of the locking system 128. In other words, following this adjustment, the valve element 104 will now be in a different, adjusted position when the regulator valve assembly 100 is mid-locked. This in turn results in a new, adjusted level of fluid flow and/or pressure associated with this adjusted mid-lock position.

The screw assembly 212 is preferably adjusted after manufacturing the regulator valve assembly 100, for example based upon the specific intended application(s) of and/or environment(s) for the regulator valve assembly 100. For example, the second plate 204 can be rotated within respective adjustment openings 210 for testing to determine the desired fluid flow and/or pressure to the duct flow passage 124. This effectively adjusts the position at which the regulator valve assembly 100 is mid-locked, for example based on the requirements, specifications, and/or environments for the particular regulator valve assembly 100 being adjusted. The screws 214 can then be tightened accordingly to lock in the desired adjustment. This allows for increased precision and flexibility, as well as potential cost savings as valve assemblies for different applications and/or environments can be manufactured in a common, cost-effective manner and then adjusted for the specific, desired applications and/or environments.

Figure 5:
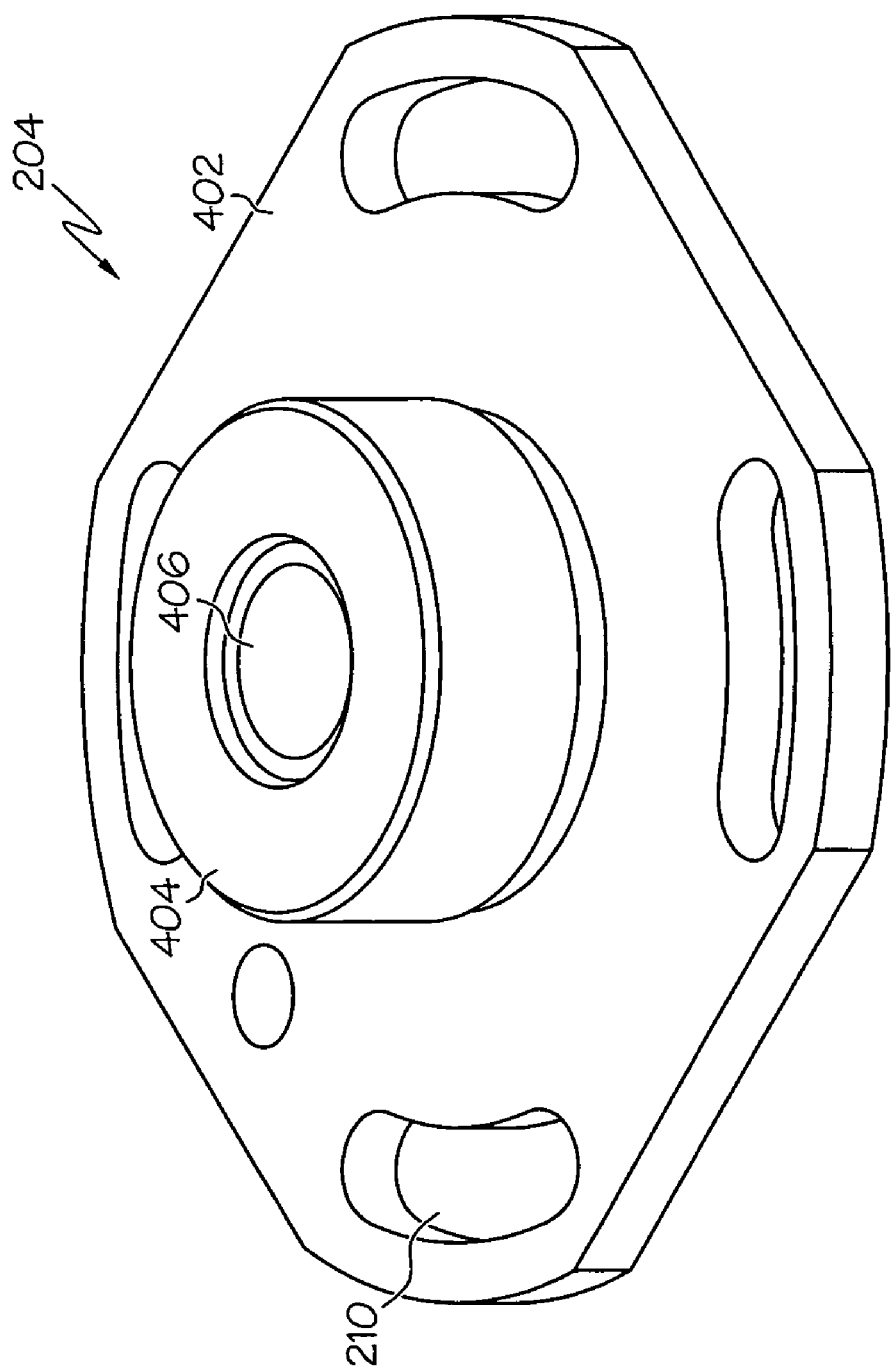
FIG. 5 is a close-up, bottom view of a second plate of the locking system of FIG. 4, in accordance with an exemplary embodiment of the present invention.

FIG. 5 is a close-up, bottom view of the second plate 204 of the locking system 128 of FIGS. 1-4, in accordance with an exemplary embodiment of the present invention. As shown in FIG. 5, in one preferred embodiment the second plate 204 also includes a lower surface 402 having a guide 404 extending therefrom. The guide 404 includes a guide opening 406 to allow the shaft 126 to extend therethrough toward, and preferably through, the first plate 202. In addition, the guide 404 allows for improved centering and guidance with respect to the second plate 204 and the locking system 128 around the shaft 126. However, this, along with various other components and/or features of the locking system 128 and/or the regulator valve assembly 100 may vary in other embodiments.

The operation of the regulator valve assembly 100 in a preferred embodiment will now be described below, assuming first that the locking system 128 is not activated and the valve element 104 is in a fully-open position, as is depicted in FIGS. 1 and 2. The fluid pressure sensor 110, if coupled to the regulator valve assembly 100, supplies fluid at a feedback pressure magnitude via the downstream sense line 111 and the third line 119 to the closing chamber 132, which exerts a force against piston 134 in an upward direction away from the valve element 104. Meanwhile, the spring 127 exerts the spring force against the piston 134, and the regulator unit 108 provides a constant, regulated reference pressure to the opening chamber 130 and against the piston 134 in a downward direction toward the valve element 104.

When the feedback pressure in the closing chamber 132 increases to the point that it overcomes the combined forces of the reference pressure in the opening chamber 130 and the spring force from the spring 127 against the piston 134, then the piston 134 moves in a direction away from the valve element 104. This in turn moves the shaft 126, and thereby moves the valve element 104 toward the closed position, provided that the locking system 128 is still not activated. In so doing, the valve element 104 moves from the fully-open position (depicted in FIGS. 1 and 2), through the intermediate position, and ultimately to the closed position, assuming that the locking system 128 is still not activated, as the locking pin 150 remains in its second position within the manual locking valve unit 116.

Conversely, when the valve element 104 is in the closed position and the feedback pressure in the closing chamber 132 decreases to the point that it is overcome by the combined forces of the reference pressure in the opening chamber 130 and the spring force from the spring 127 against the piston 134, then the piston 134 moves in a direction toward the valve element 104. This in turn moves the shaft 126, and thereby moves the valve element 104 toward the fully-open position, provided that the locking system 128 is still not activated. In so doing, the valve element 104 moves from the closed position, through the intermediate position, and ultimately to the fully-open position (depicted in FIGS. 1 and 2), assuming that the locking system 128 is still not activated. Throughout this time, the locking pin 150 remains in its second position within the manual locking valve unit 116.

Conversely, when locking of the valve element 104 in a mid-position (such as that depicted in FIG. 3) is desired, the locking system 128 is activated. Specifically, the first plate 202 and the second plate 204 are aligned so that the protrusion 208 of the second plate 204 is aligned with the opening 206 of the first plate 202, as is depicted in FIG. 3. The locking pin 150 is removed from its first position within the manual locking valve unit 116, and is placed in its second position through the opening 206 and coupled to the protrusion 208 while the valve element 104 is in an intermediate position between the fully-open and closed positions, as shown in FIG. 3. As a result, the first plate 202 is at least substantially restricted from moving. Consequently, the shaft 126 is at least substantially restricted from moving, and the valve element 104 is likewise at least substantially restricted from moving from its intermediate position. In addition, with the removal of the locking pin 150 therefrom, the manual locking valve unit 116 moves from an open position to a closed position, and fluid is at least substantially prevented from flowing therethrough from the duct flow passage 124 to the closing chamber 132 and/or the regulator unit 108.

Accordingly, an improved regulator valve is provided that can be locked in a mid-lock position, for example in order to maintain a constant effective flow area. In addition, in a preferred embodiment, the locking of the regulator valve can be adjusted, allowing for potentially improved precision, flexibility, and/or cost savings. It will be appreciated that the regulator valve may be used in any one or more of a number of different types of applications and/or environments, and that certain components of the regulator valve may vary in certain embodiments, for example as described above.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes can be made in the function and arrangement of elements described in an exemplary embodiment without departing from the scope of the invention as set forth in the appended claims and their legal equivalents.

What is claimed is:

1. A regulator valve, comprising:
   a duct having an inner surface that defines a duct flow passage;
   a valve element movably disposed within the duct flow passage and movable between a fully-open position, in which fluid is permitted to flow at least substantially freely through the duct flow passage, and a closed position, in which fluid is at least substantially restricted from flowing through the duct flow passage; and
   an actuator unit coupled to the valve element, the actuator unit configured to at least facilitate movement of the valve element between the closed position and the fully-open position and locking of the valve element in an intermediate position between the closed position and the fully-open position, the actuator comprising:
   a shaft coupled to the valve element and configured to move therewith; and
   a locking system coupled to the shaft and configured to be activated when the valve element is in the intermediate position, to thereby at least inhibit movement of the shaft and the valve element, the locking system comprising:
   a first plate coupled to the shaft and configured to move therewith;
   a second plate configured to at least inhibit movement of the first plate when the locking system is activated;
   a locking mechanism configured to couple the first plate to the second plate, to thereby inhibit movement of the first plate, when the locking system is activated; and
   a protrusion extending from the second plate, the protrusion configured to receive the locking mechanism, to couple the first plate and the second plate together and at least inhibit movement of the shaft and the valve element, when the locking system is activated, wherein:
   the second plate has a first surface facing toward the first plate and a second surface facing away from the first plate; and
   the protrusion extends from the first surface and toward the first plate.

2. The regulator valve of claim 1, wherein:
   the first plate comprises an opening configured to allow insertion of the locking mechanism therethrough for engagement by the protrusion.

3. The regulator valve of claim 2, wherein the protrusion is configured to be aligned with the opening when the valve element is in the intermediate position.

4. The regulator valve of claim 2, wherein:
   the second plate further comprises an adjustment opening formed therein; and
   the locking system further comprises a screw assembly coupled to the second plate and configured to be movable at least partially within the adjustment opening, to thereby at least facilitate movement of the second plate and the protrusion thereof for adjustment of the intermediate position.

5. The regulator valve of claim 2, wherein the locking mechanism comprises a locking pin movable between a first position, in which the locking pin does not extend through the opening, and a second position, in which the locking pin extends through the opening.

6. The regulator valve of claim 5, wherein the actuator further comprises:
a spring configured to exert a spring force; and
an opening chamber configured to receive a reference pressure;
a closing chamber configured to receive a feedback pressure;
a piston coupled between the shaft and the spring and configured to receive the spring force, the reference pressure, and the feedback pressure and to cause movement of the valve element based at least in part on the spring force, the reference pressure, and the feedback pressure when the locking system is not activated;
a regulator unit coupled to the opening chamber and configured to supply the reference pressure thereto; and
a manual locking valve unit coupled between the flow passage and the closing chamber and configured to house the locking pin in the first position, the manual locking valve unit movable between an open position, in which the locking pin is housed therein and fluid is allowed to flow between the flow passage and the closing chamber, and a closed position, in which the locking pin is not housed therein and fluid is at least substantially restricted from flowing between the flow passage and the closing chamber.

7. The regulator valve of claim 5, wherein:
the locking mechanism is movable between a first position, in which the locking mechanism does not extend through the opening, and a second position, in which the locking mechanism extends through the opening, actuator further comprises:
a closing chamber configured to receive a feedback pressure; and
a manual locking valve unit coupled between the flow passage and the closing chamber and configured to house the locking mechanism in the first position, the manual locking valve unit movable between an open position, in which the locking mechanism is housed therein and fluid is allowed to flow between the flow passage and the closing chamber, and a closed position, in which the locking mechanism is not housed therein and fluid is at least substantially restricted from flowing between the flow passage and the closing chamber.

8. The regulator valve of claim 1, wherein the intermediate position is approximately half way between the fully-open position and the closed position.

9. The regulator valve of claim 1, wherein the second plate further comprises:
a first surface and second surface on opposite sides of the second plate, the first surface facing the first plate and the second surface facing away from the first plate, the protrusion extends from the first surface; and
a guide extending from the second surface, the guide comprising a guide opening configured to allow a portion of the shaft to extend therebetween.

10. The regulator valve of claim 1, wherein the protrusion is perpendicular to the first surface.

11. A regulator valve, comprising:
a duct having an inner surface that defines a duct flow passage;
a valve element movably disposed within the duct flow passage and movable between a fully-open position, in which fluid is permitted to flow at least substantially freely through the duct flow passage, and a closed position, in which fluid is at least substantially restricted from flowing through the duct flow passage; and
an actuator unit coupled to the valve element, the actuator unit configured to at least facilitate movement of the valve element between the closed position and the fully-open position and locking of the valve element in an intermediate position between the closed position and the fully-open position, the actuator comprising:
a shaft coupled to the valve element and configured to rotate therewith;
a locking mechanism movable between a first position, in which movement of the valve element is at least substantially allowed, and a second position, in which movement of the valve element is at least substantially restricted;
a first plate coupled to the shaft and configured to rotate therewith, the first plate comprising an opening configured to allow insertion of the locking mechanism when the locking mechanism is in the second position, to thereby at least facilitate inhibiting movement of the first plate and, with it, the shaft and the valve element when the valve element is in the intermediate position;
a second plate configured to couple the first plate and the second plate together and at least facilitate inhibiting movement of the first plate when the locking mechanism is inserted into the opening;
a protrusion extending from the second plate and configured to receive the locking mechanism when inserted through the opening;
a closing chamber configured to receive a feedback pressure; and
a manual locking valve unit coupled between the flow passage and the closing chamber and configured to house the locking mechanism in the first position, the manual locking valve unit movable between an open position, in which the locking mechanism is housed therein and fluid is allowed to flow between the flow passage and the closing chamber, and a closed position, in which the locking mechanism is not housed therein and fluid is at least substantially restricted from flowing between the flow passage and the closing chamber.

12. The regulator valve of claim 11, wherein:
the second plate further comprises an adjustment opening formed therein; and
the actuator unit further comprises a screw assembly coupled to the second plate and configured to be movable at least partially within the adjustment opening, to thereby at least cause movement of the second plate and the protrusion thereof.

13. A regulator valve comprising:
a duct having an inner surface that defines a duct flow passage;
a valve element movably disposed within the duct flow passage and movable between a fully-open position, in which fluid is permitted to flow at least substantially freely through the duct flow passage, and a closed position, in which fluid is at least substantially restricted from flowing through the duct flow passage;

a regulator unit configured to supply a reference pressure; and an actuator unit coupled to the valve element, the actuator unit configured to at least facilitate movement of the valve element between the closed position and the fully-open position and locking of the valve element in an intermediate position between the closed position and the fully-open position, the actuator comprising:

a spring configured to exert a spring force;

an opening chamber configured to receive the reference pressure from the regulator unit;

a closing chamber configured to receive a feedback pressure;

a shaft coupled to the valve element and configured to rotate therewith;

a locking system coupled to the shaft and configured to be activated when the valve element is in the intermediate position, to thereby at least inhibit movement of the shaft and the valve element, the locking system further configured to be adjustable to thereby adjust the intermediate position of the valve element at which the locking system is configured to be activated, the locking mechanism comprising:

a first plate coupled to the shaft and configured to move therewith;

a second plate configured to inhibit movement of the first plate when the locking system is activated;

a locking mechanism configured to couple the first plate to the second plate, to thereby inhibit movement of the first plate, when the locking system is activated; and a protrusion extending from the second plate toward the first plate, the protrusion configured to receive the locking mechanism, to couple the first plate and the second plate together and at least inhibit movement of the shaft and the valve element, when the locking system is activated;

a piston coupled between the shaft and the spring and configured to receive the spring force, the reference pressure, and the feedback pressure and to cause movement of the valve element based at least in part on the spring force, the reference pressure, and the feedback pressure when the locking system is not activated, wherein:

the first plate comprises an opening configured to allow insertion of the locking mechanism therethrough for engagement by protrusion; and the locking mechanism comprises a locking pin movable between a first position, in which the locking pin does not extend through the opening, and a second position, in which the locking pin extends through the opening; and a manual locking valve unit coupled between the flow passage and the closing chamber and configured to house the locking pin in the first position, the manual locking valve unit movable between an open position, in which the locking pin is housed therein and fluid is allowed to flow between the flow passage and the closing chamber, and a closed position, in which the locking pin is not housed therein and fluid is at least substantially restricted from flowing between the flow passage and the closing chamber.

14. The regulator valve of claim 13, wherein:

the second plate further comprises an adjustment opening formed therein; and the locking system further comprises a screw assembly coupled to the second plate and configured to be movable at least partially within the adjustment opening, to thereby at least facilitate movement of the second plate and the protrusion thereof.

* * * * *